SYSTEM FOR CONVERTING ELECTRICAL CODE INTO SHAFT ROTATION

Filed March 4, 1953 3 Sheets-Sheet 1

INVENTOR.
BERNARD LIPPEL
BY Harry M. Saragovitz
Attorney

INVENTOR.
BERNARD LIPPEL
BY
Harry M. Saragovitz
Attorney

SYSTEM FOR CONVERTING ELECTRICAL CODE INTO SHAFT ROTATION

Filed March 4, 1953 3 Sheets-Sheet 3

INVENTOR.
BERNARD LIPPEL
BY
Harry M. Saragovitz
Attorney 2,711,499

SYSTEM FOR CONVERTING ELECTRICAL CODE INTO SHAFT ROTATION

Bernard Lippel, Red Bank, N. J., assignor to the United States Government as represented by the Secretary of the Army Application March 4, 1953, Serial No. 340,415

16 Claims. (Cl. 318—28)

Figure 1:
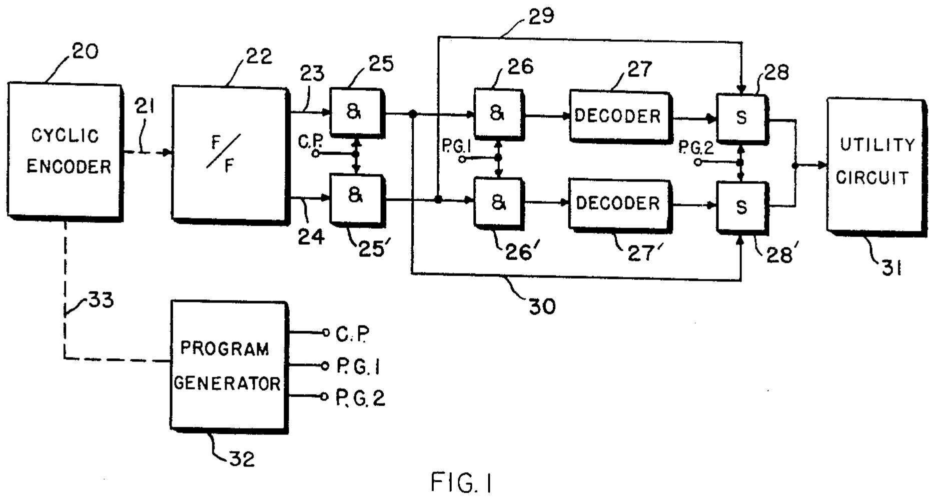

(Granted under Title 35, U. S. Code (1952), sec. 266)

The invention described herein may be manufactured and used by or for the Government for governmental purposes, without the payment of any royalty thereon.

This invention relates to pulse code signalling systems wherein the signal amplitudes are periodically encoded as code groups of pulses. In particular the invention relates to a signalling system in which the signal amplitude is periodically sampled and encoded in the cyclic binary code and the pulses of the code groups are transmitted with the least significant digit first. The invention is also primarily concerned with translating, without loss of time, from the cyclic to the standard binary code or a form thereof and for utilizing the translated signals.

The advantages of encoding analogue or signal values as binary code groups of pulses are well known and will not be discussed in detail here. Briefly, encoding the signals permits the data to be transmitted in a form which is less subject to error and immune to interference. The further advantages of encoding the signal values in the cyclic binary code are also well known and may be summarized by stating simply that there is less probability of error in the encoding process.

The cyclic code, also known as reflected binary code, has, however, the disadvantage that when the digital code group signals are to be used in arithmetic operations, or are to be decoded to a corresponding amplitude value at the receiver, they ordinarily require translation to a form of standard binary code.

An example of translation from cyclic to standard binary code is shown and described in applicant's co-pending application Serial No. 219,103, filed April 3, 1951, now Patent No. 2,679,644, entitled Data Encoder System and assigned to the present assignee, the Government of the United States of America. An example of the decoding of cyclic binary code group signals is described, together with detailed expanation of the cyclic and the standard codes, in United States Patent 2,538,615 issued January 16, 1951, to R. L. Carbrey. The complications which are ordinarily incurred in decoding signals in cyclic binary code are well illustrated by the arrangement disclosed in this patent.

Heretofore transmission from cyclic to standard binary code could most readily be effected when the digital code group signals were transmitted simultaneously in parallel channels or when the digital code group signals were transmitted serially with the most significant digit occurring first. Both of these provide a translated signal which is unsuitable for use with the most economic types of serial operating arithmetic units and decoders. When such units are employed these arrangements result in a loss of time since all of the digit signals of a code group must be received before their utilization may be started. The present invention overcomes these difficulties by providing for serial translation from cyclic to standard binary code with the least significant digit occurring first in time.

It is accordingly an object of the present invention to provide a signalling system in which signals are encoded in cyclic binary code and translated to a form of standard binary code in an arrangement which avoids many of the disadvantages and limitations of prior art arrangements.

It is also an object of the present invention to provide a cyclic to standard binary code translator which employs a bistable circuit which is actuated by the cyclic code pulses occurring serially with the least significant digit first. Such a circuit is often termed "flip-flop" in computers although that term is more generally used to describe monostable multivibrators.

It is a further object of the present invention to provide a signalling system in which signalling values are serially translated from cyclic to standard binary code and serially decoded without delays.

It is an additional object of the present invention to provide a digital servo system wherein incoming and local analogue data are each initially encoded in cyclic binary code and each serially translated with the least significant digit first to usable forms of standard binary code.

In accordance with the present invention, a signalling system is comprised of means for periodically generating signalling values as pulse code group signals in the $n$ digit cyclic binary code with means for transmitting the pulse groups serially during consecutive digit intervals 1 to $n$ with the least significant digit first. The system comprises translating means utilizing a circuit of the so called flip-flop or multivibrator type having two stable and reversible conditions of operation. The received signals are applied to the translating means so that successive pulses reverse the condition of operation from one stable condition to the other to convert the cyclic pulse code group signals to corresponding pulse code group signals in the $n$ digit standard or reversed standard binary code during the digit intervals 0 to $(n-1)$, where the interval 0 occurs one digit interval earlier in time than the interval 1, together with a control digit signal which occurs during the interval $n$ and means responsive to the control digit signal for utilizing the translated signals as standard binary code group signals.

Also in accordance with the invention, a digital servo system is comprised of means for periodically encoding and serially transmitting in separate channels the input and the output analogue data in the form of pulse code group signals each in the cyclic binary code. Means are provided in each channel, comprising a bistable circuit, for simultaneously and serially translating each of the pulse code group signals to corresponding pulse code group signals each of which are in a form of the standard binary code together with a digit control signal. Also there are provided means for serially adding in one path and subtracting in another path the translated signals together with serially decoding means in each path for producing a decoded potential. Further means are provided for utilizing the control digit signals from both of the channels to select the one of the decoded potentials which, fortuitously, correctly represents the magnitude of the difference of the translated signals. Further means are provided for utilizing the control digit signal from the input channel to determine the polarity of the selected potential thereby to provide an error control potential and means for utilizing the control potential are provided to adjust the source of the output analogue data to minimize the difference.

For a better understanding of the present invention, together with other and further objects therein, reference is had to the following description, taken in connection with the accompanying drawing and its scope will be pointed out in the appended claims.

Figure 2:
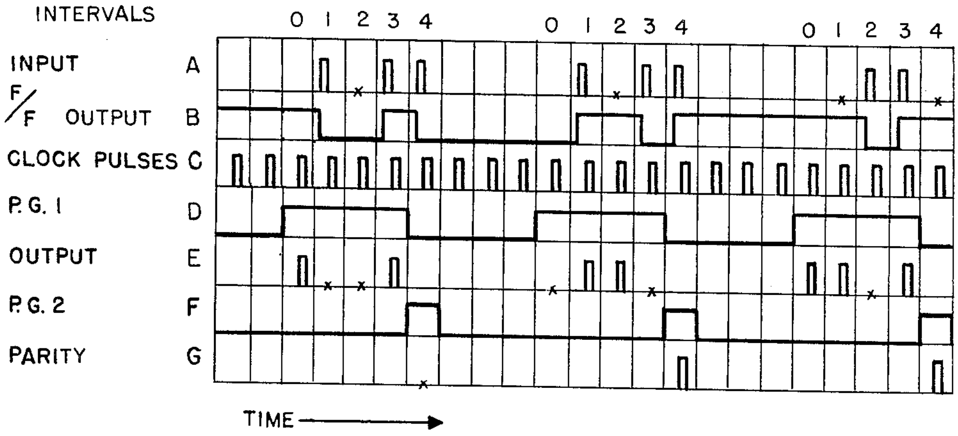
Figure 3:
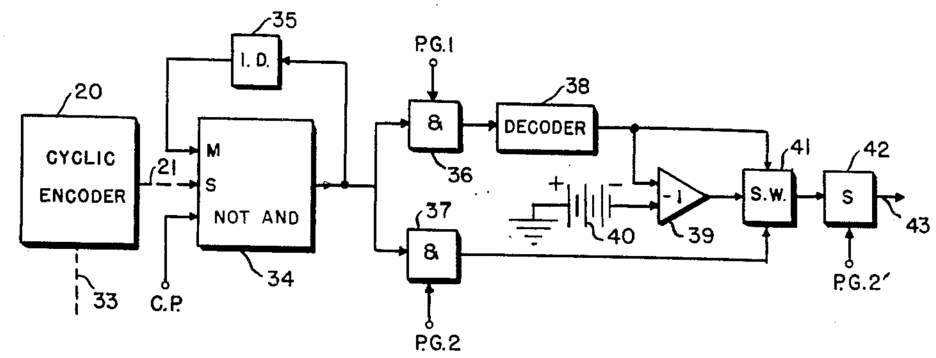
Figure 4:
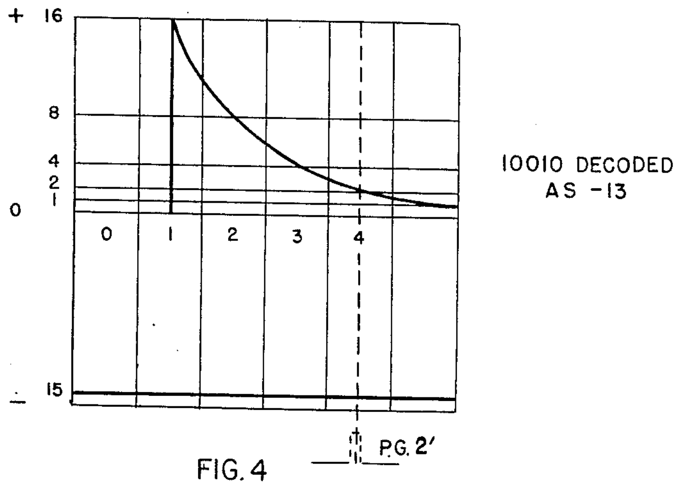
Figure 5:
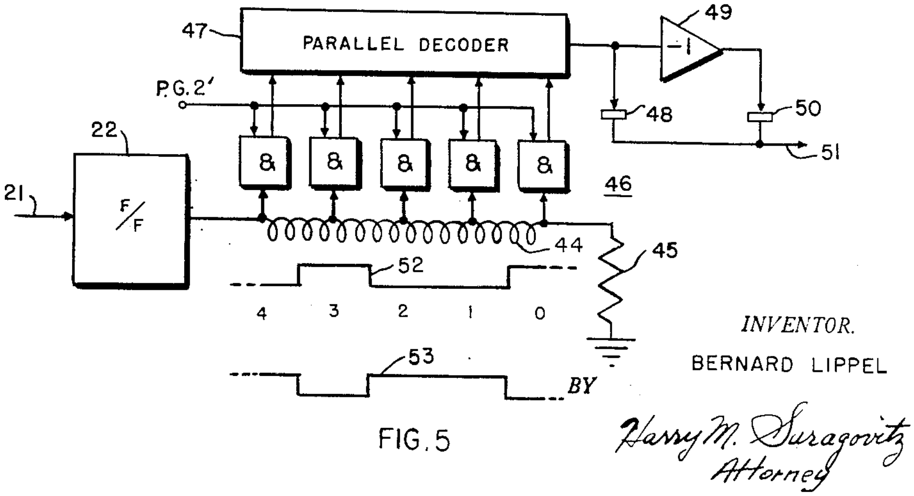
Figure 6:
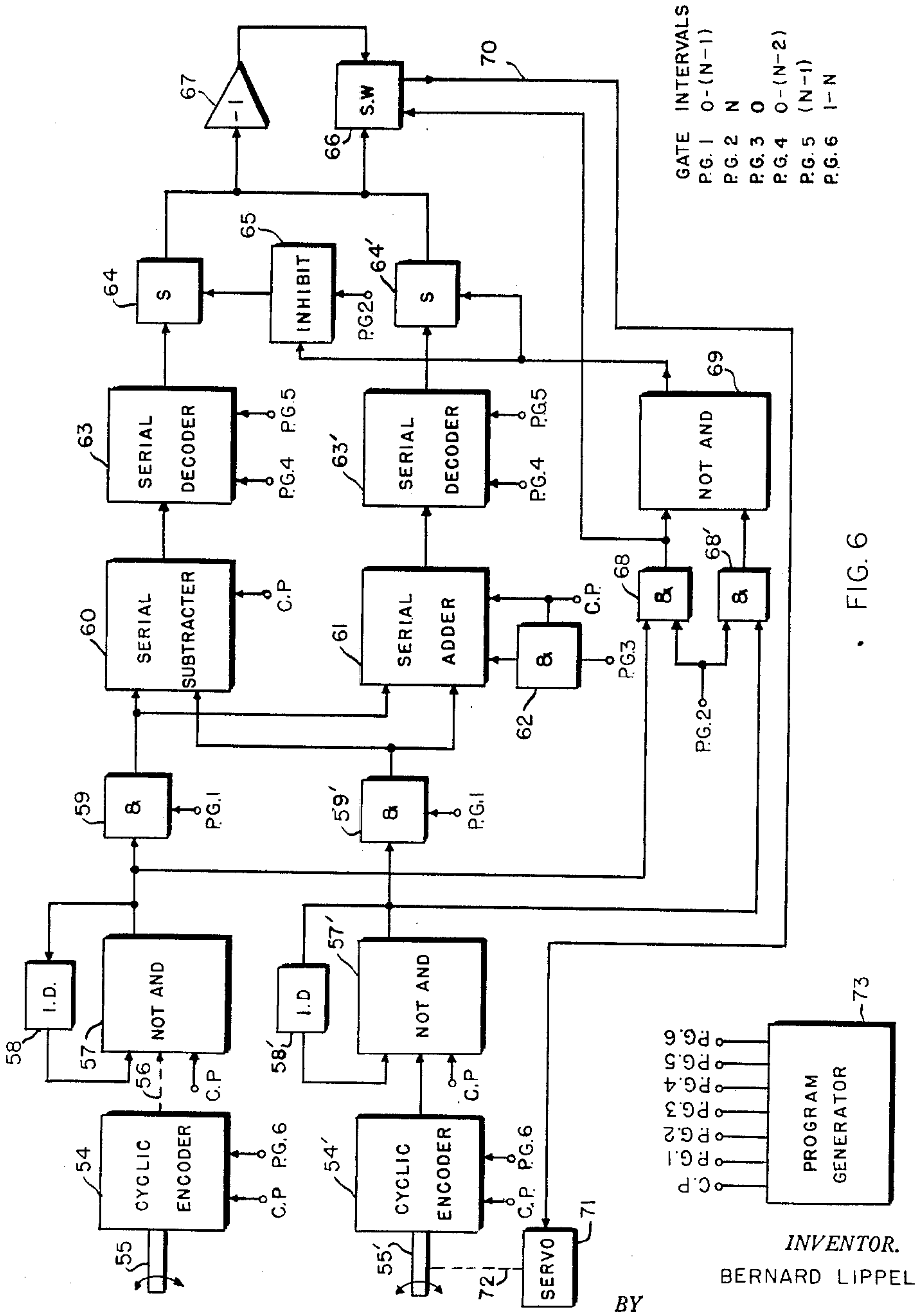

In the drawings Fig. 1 is a block diagram of a preferred form of the signalling system in accordance with the present invention; Fig. 2 is a graph, for use in describing the operation of the system of Fig. 1, which illustrates the electrical wave forms at various points in the system; Fig. 3 represents another preferred arrangement of the signalling system in accordance with the invention; Fig. 4 is a graph illustrating the operation of the decoder which is a part of Fig. 3; Fig. 5 is an illustration partly in block and partially in schematic diagram, of a different arrangement of the signalling system; and Fig. 6 is a block diagram illustrating a digital servo system arranged to operate in accordance with the invention.

Referring now particularly to Fig. 1 the block diagram illustrates a complete signalling system comprising an encoder 20 for encoding signal values as cyclic binary code groups of pulses and for transmitting them serially with the least significant digit first via a transmission medium, indicated by the dotted line 21, to the input of the receiving system. The first unit of the receiver is a flip-flop or bistable circuit 22 such as an Eccles-Jordan type of circuit having opposite polarity outputs 23 and 24 which are coupled respectively on input of AND gates 25 and 25' to which clock pulse signals provided by program generator 32 are also coupled. The output of gate 25 is coupled to an input of an AND gate 26 and similarly the output of gate 25' is coupled to the input of the AND gate 26'. Program generator 32 supplies program gate control signals labeled PG1 to AND gates 26 and 26'. The output of gates 26 and 26' are coupled respectively to inputs of similar serial decoders 27 and 27' and the output of these decoders are supplied respectively to switch gates 28 and 28' to which actuating signals labeled PG2 from program generator 32 are also supplied. The outputs of AND gates 25 and 25' are also cross connected respectively to actuating inputs of switch gates 28' and 28 and the outputs of the gates 28 and 28' are both connected together and applied to the input of a utilizing circuit 31.

The signalling system of Fig. 1 and those which follow are all of the synchronized type in that the signal or analogue value is periodically sampled at some chosen uniform rate and each sampled value is encoded as a digital code group of pulses during an interval of time which is termed a word or number interval. Systems of this type are described in numerous articles in the technical literature and in particular in an article entitled "Logical description of some digital computer adders and counters," by Harry J. Gray, Jr., published in the January 1951 issue of the Proceedings of the Institute of Radio Engineers and in an article entitled "Typical block diagrams for a transitor digital computor," by J. H. Felker, published in the December 1952 issue of Electrical Engineering. As shown in these articles each word or number may comprise a large number of digit intervals. Additional synchronizing and directing pulses may be included and a short spacing interval is provided between the words. The consecutive digit intervals may be of very short duration, in some cases being of only one microsecond duration. The present invention is however not to be construed as limited only to such high speed operation. In these systems the operation is ordinarily under control of a program generator such as that here indicated by the unit 32.

When the encoder 20 is remote from the other apparatus of Fig. 1 the transmission may be wire line or by radio link as has been generally indicated by the dotted connection 21 and the program generator 32 will be synchronized with the transmitter unit 20 as indicated for generality by the dotted line 33. Where, however, the entire system is local, the program generator 32 may furnish synchronizing pulses for operating the unit 20. Such synchronization may be accomplished by many known means and, since it forms no part of the present invention, it will not be discussed further.

The encoder 20 may be for example an arrangement for encoding telephone speech wherein voltage signals which are the speech analogue are sampled at a high and uniform rate. For such a device the encoding may be accomplished by a cathode ray encoder of the type described in the article "Electric beam deflection tube for pulse code modulation," by R. W. Sears, in the January 1948 issue of the Bell System Technical Journal. With such an encoder the digit signals of each code group are generated serially in accordance with the scanning sweep of the cathode ray across a target electrode. For operation in accordance with the present invention, the direction of the scanning sweep will be chosen to generate the digit signals with the least significant digit first. The program generator 32 also supplies narrow and consecutive clock pulses, one during each digit signal interval, and a representation of the clock pulses is shown by the wave form C of Fig. 2 Ordinarily clock pulse signals will be available from the program generator 32 in various phases or small delays as may be required to fit the operation of the system.

Considering now the operation of the system and referring for explanation to the wave forms shown in Fig. 2, an example of digital code group signals supplied to the input of the bistable or flip-flop unit 22 is shown as wave form A which consists of three successive words or binary numbers in the 4 digit cyclic code transmitted during digit intervals 1 to 4. In practice a much larger number of digit signals during intervals 1 to $n$, are used where $n$ may be as high as 10 or 15. In the present example $n$ equals 4. The three numbers shown as transmitted serially in cyclic code are;

9=1101
9=1101
4=0110

The 1's of the digit signals are transmitted as positive pulses and the 0's are transmitted as blanks, which for convenience of identification in this drawing have each been designated by a small $x$.

The occurrence of a pulse at the input of the flip-flop translator 22 will cause a change from one stable state to the other. In the corresponding wave form B which indicates the output at terminal 23, it has been assumed that the initial condition is such that there is a positive voltage present at this terminal which drops to zero when a pulse is received. With the occurrence of a following pulse the output again returns to a positive value and with the next pulse returns to zero and so forth. Accordingly the wave form B in Fig. 2 shows the change of output at terminal 23 in correspondence with each received input pulse. The corresponding output at terminal 24 is exactly opposite and accordingly has not been shown in the drawing. By this it is meant that the output at 24 is taken from another output point of the multivibrator or bistable circuit so that initially the output voltage is zero and rises to a positive value with occurrence of a first pulse, drops to zero for a second pulse, rises with a third and so forth. In other words the outputs at 23 and 24 are of opposite polarity. The program gate pulses supplied to the circuit of Fig. 1 at the terminals labeled PG1 and PG2 are illustrated respectively as the wave forms D and F of Fig. 2.

The units which have been described as AND gates are typical gating units such as those described in the aforementioned articles by Gray and Felker. In the case of gates 25 and 25' two input signals are required in order to produce an output signal and hence these may be referred to as two terminal AND gates. Similarly the gates 26 and 26' are two terminal AND gates. The units 28 and 28' are termed switch gates and labeled S and require two simultaneously occurring actuating signals to permit an input signal to pass.

Before proceeding further with an explanation of the operation of the system it should be noted that numbers in binary form are ordinarily written from left to right with the most significant digit at the left and diminishing to the least significant digit at the right. In the graphs shown in Fig. 2 the wave forms are drawn as ordinarily shown on an oscilloscope and time is increasing from left to right so that the cyclic number 1101, corresponding to the decimal number 9, is shown with the least significant digit first in time and so, at the left, during the interval 1 and the most significant digit last in time in the digit interval 4.

In the present invention, the operation is characterized by the fact that the translated signal actually begins to appear at the output (in this case at the output of gate 25 as shown by wave form E) one digit interval earlier in time than the signal applied at the input of the bistable unit 22. Briefly this is because the translation may occur correctly as a standard binary number or it may occur incorrectly as a reversed standard binary number. Furthermore the form in which it occurs is completely fortuitous since it depends upon the initial state of the flip-flop unit 22 and upon whether the input cyclic code number is odd or even. With this brief explanation, which will be clarified later, it will be noted that the gate signal PG1 which is applied to the AND gate 26 occupies a four digit interval starting with the digit interval 0 and ending with the digit interval 3. As has been stated, the initial output of unit 22 at terminal 23 has been assumed positive and therefore a positive voltage is applied to gate 25 during the interval 0 while clock pulses are applied continuously thereto. Accordingly during the interval 0 a clock pulse appears at the output of gate 25 and is applied to the input of gate 26. Also during the interval 0 positive voltage is applied via the terminal PG1 to the gate 26 and accordingly a pulse voltage appears in the output of gate 26 during the interval 0.

The operation may be followed by reading down the columns of Fig. 2 for the successive digit intervals 0, 1, 2, 3, and 4, and it will be evident that the cyclic number 1101 which is transmitted during digit intervals 1, 2, 3, and 4 is translated to the standard binary number 1001 during the digit intervals 0, 1, 2, and 3 as shown by the output wave form E. In other words the input number 1101 in cyclic cods has fortuitously been translated correctly to 1001 in standard binary code. Furthermore the translation has been accomplished one digit interval earlier in time, and in fact, before the last digit signal of the first input number has been transmitted.

With the completion of this translation of the first number, the output terminal 23 of the flip-flop unit 22 has been left at zero potential (opposite to the initial condition) when the second word, which is also the number 9 in cyclic code, is transmitted. Again the translation starts and ends one digit interval early in time (that is, translation is again accomplished during the digit intervals 0, 1, 2, and 3) but in this case the number is translated in reverse and appears as the binary number 0110. This reverse form is generally referred to as the 1's complement and, as is well known, it may be changed to the true complement by adding a 1.

The utilization of the complementary form will be explained in relation to other arrangements of the system but for the present, in considering the circuit of Fig. 1, this reverse form will be temporarily termed an incorrect translation. As was stated above, the output at terminal 24 is of opposite polarity to that at output terminal 23. It will therefore be clear that in the case of the first word, translated correctly by the upper channel, the translation in the lower channel was incorrect in that the reverse form was produced. Similarly, with the second number incorrectly translated in the upper channel, the translation is now correct in the lower channel. Accordingly whenever a word or number is correctly translated in one channel it is incorrectly translated in the other.

To select the correct translation and avoid loss of time the system in Fig. 1 employs two similar serial decoders 27 and 27' which receive the binary number pulse outputs of gates 26 and 26' and decode these pulse code groups as standard binary numbers to produce an output voltage amplitude which is to correspond to the original sampled signal values. A preferred form of serial decoder for this purpose would be the Shannon type of decoder, a description of which will be found in the November 1948 issue of the Bell Laboratories Record at pages 451–456. Accordingly if the translation is correct in the upper channel and incorrect in the lower channel the decoder 27 decodes the input number to its analogue value correctly and completely by the end of digit interval 3 and therefore the choice of the correct output can be made during the digit interval 4 by sampling the decoder output during this interval. It has been noted that the output of gate 25 has been cross coupled by connection 30 to a control terminal of switch gate 28' and similarly the output of gate 25' has been cross coupled by connection 29 to a control terminal of the switch gate 28. The output of each decoder is also coupled to an input of its respective switch gate 28 or 28' and a program pulse PG2 is also supplied to a control terminal in each of these gates during each interval 4.

Form an inspection of output wave form G it will be evident that whenever there is an incorrect translation an output pulse occurs during interval 4. Accordingly when the first number shown in Fig. 2, is correctly translated there will be a pulse termed the parity or control pulse produced in the lower channel during interval 4. This pulse actuates gate 28 (while gate 28' remains closed) so that the output of decoder 27 is sampled during interval 4 and applied to the utilizing circuit 31.

Conversely for the second and third numbers or words shown in Fig. 2 the upper channel translation is incorrect and therefore a control signal occurs (see wave form G) during intervals 4 to cause the output of decorder 27' to be sampled. Since, for these numbers, the lower channel translation and decoded values are correct, the correct output is again supplied to circuit 31. In the example here under consideration the utility circuit 31 may simply be an audio amplifier and loud speaker or telephone receiver for reproducing the decoded speech signals. The control pulse signal which occurs during the digit interval 4 in our example is for convenience termed a parity signal and its occurrence and use is the basis of operation in all of the arrangements which are yet to be described. In the operation as thus far explained the signal is actually translated 1 digit interval earlier in time but the translation, as to this correctness, cannot be determined until the last digit interval. Accordingly in this arrangement the complete translation and decoding is accomplished with simple serially operating units and the selection of the correct result occurs without any loss of time since the action is completed during the last digit interval. The only delays are those inherent in the operation of the circuit elements themselves. Such operating delays are, ordinarily, a small fraction of a digit interval and the system accordingly involves no artificial delay elements such as those that are ordinarily employed in prior art arrangements.

To recapitulate, the encoder 20 in the signalling system of Fig. 1 is a means for generating signalling values as pulse code group signals in the $n$ digit binary code and for transmitting the groups serially with the least significant digit first during digit interval 1 to $n$. The flip-flop unit 22 is a translating means having two stable conditions of operation which are reserved by successively received pulses. With the introduction of the clock pulses via the gates 25 and 25', the signals are converted to corresponding pulse code group signals in both the standard binary code and the reversed standard binary code during the digit intervals 0 to $(n-1)$ together with a control digit signal (the parity signal), which occurs during the interval $n$, and the gates 28 and 28' comprise means which are responsive to the control digit signals for selecting and utilizing the translated signal which is a standard binary code group signal.

It has been stated and in part demonstrated that the translation will be in the form of the corresponding standard binary number or the reversed standard binary number depending fortuitously upon whether the input number in cyclic code is an odd or even number and depending upon the initial condition or state of the flip-flop translating unit. The columns below show the decimal numbers 0 to 15 with their corresponding cyclic code numbers and the two possible forms of translation which have been labeled A and B.

| Decimal Number | Cyclic Binary | | | | | Binary Translation A | | | | | Binary Translation B | | | | |
|---|---|---|---|---|---|---|---|---|---|---|---|---|---|---|---|
| | 4 | 3 | 2 | 1 | 0 | 4 | 3 | 2 | 1 | 0 | 4 | 3 | 2 | 1 | 0 |
| 0 | 0 | 0 | 0 | 0 | | 1 | 1 | 1 | 1 | 1 | 0 | 0 | 0 | 0 | 0 |
| 1 | 0 | 0 | 0 | 1 | | 0 | 0 | 0 | 0 | 1 | 1 | 1 | 1 | 1 | 0 |
| 2 | 0 | 0 | 1 | 1 | | 1 | 1 | 1 | 0 | 1 | 0 | 0 | 0 | 1 | 0 |
| 3 | 0 | 0 | 1 | 0 | | 0 | 0 | 0 | 1 | 1 | 1 | 1 | 1 | 0 | 0 |
| 4 | 0 | 1 | 1 | 0 | | 1 | 1 | 0 | 1 | 1 | 0 | 0 | 1 | 0 | 0 |
| 5 | 0 | 1 | 1 | 1 | | 0 | 0 | 1 | 0 | 1 | 1 | 1 | 0 | 1 | 0 |
| 6 | 0 | 1 | 0 | 1 | | 1 | 1 | 0 | 0 | 1 | 0 | 0 | 1 | 1 | 0 |
| 7 | 0 | 1 | 0 | 0 | | 0 | 0 | 1 | 1 | 1 | 1 | 1 | 0 | 0 | 0 |
| 8 | 1 | 1 | 0 | 0 | | 1 | 0 | 1 | 1 | 1 | 0 | 1 | 0 | 0 | 0 |
| 9 | 1 | 1 | 0 | 1 | | 0 | 1 | 0 | 0 | 1 | 1 | 0 | 1 | 1 | 0 |
| 10 | 1 | 1 | 1 | 1 | | 1 | 0 | 1 | 0 | 1 | 0 | 1 | 0 | 1 | 0 |
| 11 | 1 | 1 | 1 | 0 | | 0 | 1 | 0 | 1 | 1 | 1 | 0 | 1 | 0 | 0 |
| 12 | 1 | 0 | 1 | 0 | | 1 | 0 | 0 | 1 | 1 | 0 | 1 | 1 | 0 | 0 |
| 13 | 1 | 0 | 1 | 1 | | 0 | 1 | 1 | 0 | 1 | 1 | 0 | 0 | 1 | 0 |
| 14 | 1 | 0 | 0 | 1 | | 1 | 0 | 0 | 0 | 1 | 0 | 1 | 1 | 1 | 0 |
| 15 | 1 | 0 | 0 | 0 | | 0 | 1 | 1 | 1 | 1 | 1 | 0 | 0 | 0 | 0 |
| | 15 | 7 | 3 | 1 | | −15 | 8 | 4 | 2 | 1 | −15 | 8 | 4 | 2 | 1 |

In order further to illustrate the preceding and following descriptions, it is assumed that the numbers are transmitted serially with the least significant digit first. Therefore the digit intervals have been shown above the numbers and thereby indicate that the cyclic binary numbers are transmitted during the intervals 1, 2, 3, and 4. The column labeled binary translation A indicates the translation of each input number for the assumed condition that the bistable translator has an initial positive output during the interval zero. Under this condition it will be seen that the translation occurs during the digit intervals 0, 1, 2 and 3 together with a parity digit signal in interval 4. It will be noted that the digit signal is always a 1 during the zero interval and that the digit signal is alternately a 1 and 0 in the 4th or parity interval. The parity signal is a 1 when the numbers are even and a 0 when the numbers are odd. Accordingly, reading down the column, it will be seen that all odd numbers are correctly translated to standard binary notation and all even numbers are translated in reverse, the 1's complement, together with a 1 in the parity interval so that the reverse translation is identified and may be properly utilized.

Similarly for the column labeled binary translation B, it is assumed that the bistable circuit output is initially zero and under these conditions it will be seen that, in the digit interval zero, the digit signal output is always a 0. All even numbers are now translated correctly and all odd numbers are translated in reverse together with a 1 in the 4th or parity interval to enable the reversed translation to be utilized.

For reference the weighted values of the digit signals are labeled below the column. Ordinarily the weighted values for the standard binary numbers are, starting with the least significant digit, 1, 2, 4, 8, 16, and so forth; i. e., powers of two. It will be noted that weighted value of the digit signal in the 4th interval has, however, been labeled −15 rather than +16. The reason for this is that we may here take the point of view that we have translated a 4 digit cyclic binary number to a 5 digit standard binary number in which the translation is always correct as to the magnitude of the number but either correct or reversed in algebraic sign depending upon the initial condition of the bistable translator and whether the number is odd or even. This will be evident by the consideration of any one of the numbers in the columns of translations A and B. Where there is a zero in the 4th digit interval the sum of the weighted values of the digits is a positive number and correctly represents the magnitude. Where there is a 1 in the 4th digit interval the sum of the weighted values is a negative number which however is of the correct magnitude. Accordingly the previous designation of an output from the translator as correct or incorrect will no longer be used since all translations are correct except as to algebraic sign and the digit signal in the parity interval enables the error in sign to be corrected.

This process is made use of in the circuit arrangement of Fig. 3 which is like Fig. 1 in that it employs the cyclic encoder 20 which periodically samples and encodes analogue data in cyclic binary code and transmits the pulse groups of signals with the least significant digit first to a bistable translator via the connection 21. The program generator 32 and utilizing circuit 31 of Fig. 1 are implied but have not been shown in the drawing. Synchronization of the encoder as in Fig. 1 is indicated by the dotted terminal 33. The gating control signals PG1 and PG2 as supplied to the units are like those employed in the Fig. 1 arrangement and as shown in the wave form diagrams of Fig. 2. In the Fig. 3 embodiment of the invention a preferred form of bistable or flip-flop circuit is employed which is particularly suitable for high speed operation. This arrangement is termed dynamic flip-flop unit and is comprised of a logical NOT AND circuit unit 34 to which clock pulses are continuously supplied. The cyclic coded pulse groups are applied to the input labeled S and the output is fed back to the input M via a 1 digit interval delay line 35. The output is also coupled to the input of AND gates 36 and 37. Program pulses PG1 which provide operating potential during the digit intervals 0 to 3 are applied to an input of gate 36 and program pulses PG2 are applied to an input of the gate 37 during digit intervals 4.

The output of gate 36 is applied to the input of a serial decoder 38 which may be of the Shannon type aforementioned. The output of the decoder 38 which is here assumed to be a positive voltage is applied to an electronic switch 41, also labeled SW. The output of decoder 38 is also supplied to the input of a unity gain summing and polarity reversing amplifier 39 to which a chosen potential from a D. C. source 40 is also applied. The output of the summing amplifier 39 is also supplied to a terminal of the electronic switch 41. The output of gate 37 is connected to the control terminal of the electronic switch 41 to switch from the output of decoder 38 to the output of the amplifier 39. The output of switch 41 is coupled to the input of a sampling switch gate 42 and the output of 42, labeled 43, is to be connected to a utilizing circuit. From the program generator, not shown, a sampling pulse labeled PG2′ occurs periodically during the *n*th, in this case the 4th, digit interval of each word, i. e., in synchronization with the pulses PG2. In the present instance, however, the PG2′ pulse is narrow as illustrated in Fig. 4 in order to sample the decoder output during a chosen time in the *n*th digit interval.

The dynamic flip-flop or bistable unit which is comprised of units 34 and 35, is an arrangement such as that described in the aforementioned article by Gray and further described in a copending patent application Serial No. 298,345, filed July 11, 1952, in the name of Harry J. Gray, Jr., now abandoned, and assigned to the assignee of this patent the Government of the United States of America. The NOT AND unit is an abbreviated form of what is frequently termed a half adder-subtractor and is generally built up of combinations of biased diode rectifiers. The schematic circuits are shown in the aforementioned article and pending application and will not be repeated here. Briefly, however, if during any digit interval, pulses are applied simultaneously to input terminals M and S, no pulse will appear at the output. Hence the name, NOT AND circuit. If a pulse is applied at either terminal alone, an output pulse will be produced and such pulse will continue to be produced during each digit interval until such action is terminated by the presence of pulses at both M and S simultaneously. The arrangement therefore comprises a bistable unit having two conditions of operation. Thus, if initially there is no output from unit 34 and a single pulse is applied from line 21 to terminal S, there will be an output pulse and, due to the one interval feed back delay of unit 35, there will continue to be output pulses from unit 34 during each digit interval until another pulse arrives over line 21. With the arrival of a second pulse at terminal S, the output from 34 ceases and this condition obtains until another input pulse from line 21 arrives to start another succession of output pulses.

Considering now the operation of the system and understanding the functioning of units 34 and 35 as a dynamic flip-flop unit, it will be clear that the operation is similar to that described for the arrangement of Fig. 1. Here, however, there is only a single output from the translator. It follows, therefore, that when the pulses of the digital code group signals are supplied during word intervals to the input S of 34 from line 21, the output will be, fortuitously, a correct or a reversed translation into standard binary code during the intervals 0 to $(n-1)$, together with a parity digit signal in the $n$th, interval. Here again we shall consider a 4 digit input signal so that $n=4$.

The Shannon type decoder 38 receives the digit signal output of 34 during the intervals 0 to 3 as was the case in the Fig. 1 arrangement because the AND gate 36 is operated during these intervals by virtue of the PG1 gate pulses. Accordingly the decoder 38 builds up a voltage which is positive and proportional to the weighted values of the first four digits. The switch 41 is assumed to normally connect to the output of decoder 38 so that this output is supplied directly to the gate 42 where the output is sampled during the 4th digit interval. When, however, there is a pulse corresponding to a 1 in the 4th digit interval, a reversed translation is indicated and the pulse is passed during interval 4 via gate 37 since 37 is made operative during this interval by the program pulse PG2. Consequently the switch 4 is now connected to the output of reversing amplifier 39. The amplifier 39 receives the positive voltage output of the decoder 38, corresponding in magnitude to the weighted values of the digit signals during intervals 0, 1, 2, and 3 together with a negative voltage from battery 40 of magnitude to correspond to the weighted value —15. It will be clear, therefore, that when, fortuitously, the reversed translation occurs, the correct magnitude is provided by the sum of the output of decoder 38 and the voltage of the battery 40 and that this sum will always be a negative voltage. However, the unity gain amplifier 39 reverses this polarity so that the output of unit 39 always provides the correct magnitude and polarity of output potential.

Fig. 4 provides a simplified representation of the operation of decoder 38, which is assumed to be of the Shannon type wherein the pulses applied to the input of the decoder produce charges on a condenser, which charges is allowed to decay exponentially. The number 13 has been chosen as an example and in standard binary code is written as 1101. Here, however, it will be assumed that the translation has occurred in reverse and accordingly the output number from translator 34 is the five digit number 10010. The first four of these digits alone are applied to the input of decoder 38 and the decoding is indicated by a showing of the charge of a condenser to a value +16 which occurs during interval 1 and thereafter decays exponentially, dropping to half magnitude during each digit interval, so that at interval 4 it will be seen that the magnitude of the charge has a value of 2. Since, however, the parity digit signal is a 1 during interval 4, the operation as above described requires that the switch 41 be connected to the output of amplifier 39 during interval 4 and accordingly the output of 39 when sampled during this interval is the reversed sum of the decoder output of magnitude +2 and the battery potential which is —15. Accordingly, as the graph shows, the net value of the potentials supplied to the input of amplifier 39 is $-15+2=-13$ and the output of 39 is accordingly a voltage of +13 which is the correct and desired analogue value.

Fig. 5 illustrates still another arrangement of the invention wherein the cyclic encoded groups of pulses are supplied via the connection 21 to a bistable translator 22 as in Fig. 1. Alternatively the bistable translator may be of the form shown in Fig. 3 and comprised of the units 34 and 35. The cyclic encoder 20, the utilizing circuit 31, and the program generator 32 are not shown but their presence is implied. The arrangement of Fig. 5 is for use with a parallel type of decoder and differs from the preceding arrangement principally in that clock pulses need not be supplied. However, it is still essential to the operation that the transmission be standardized as in the previous arrangement in accordance with a synchronized system.

The output of translator 22 is coupled to the input of a uniform transmission line 44 which is terminated by a resistor 45 chosen to match the characteristic impedance of the line 44. The line 44 is chosen of suitable length so that its effective length is equal to $n$ digit intervals. Again, for illustration, $n$ is chosen to equal 4. The line 44 is, therefore, 4 digit intervals in length and by this it is meant that a signal appearing at the output of unit 22 will progress down the line and appear across the output terminal 45 after the time elapse of 4 digit intervals. At points along the line are a plurality of $n$ output connections as shown in the diagram. These are spaced along the line at points corresponding to one digit intervals. These outputs are connected each to a terminal of a corresponding plurality of two terminal AND gates, labeled collectively 46. To the other input terminals of the AND gates 46 a program pulse PG2′ is applied. This pulse is a narrow "reading" pulse like that indicated in the drawing, Fig. 4, which occurs at a chosen time during the $n$th, 4th, interval. The several outputs of the AND gates 46 are coupled to the input terminals of a parallel decoder 47. The output potential of the decoder 47 is supplied to an output terminal 51 via what is termed an absolute magnitude circuit. The absolute magnitude circuit is comprised of a rectifier 48 which connects directly to the output terminal 51 and another rectifier 50 which connects via a polarity reversing unity gain amplifier 49 to the output terminal 51.

The wave form 52 drawn below transmission line 44 is to enable the operation of the system to be visualized. It is a redrawing of the wave form B of Fig. 2 which represents the translation of the cyclic number 1101=9 at the output of the translator 22. Here the wave form is reversed from left to right to indicate its appearance as voltage potential distributed along the transmission line 44 at the sampling instant when the "reading" pulse PG2′ occurs; i. e., the voltage distribution along the line 44 at the time of occurrence of the PG2′ pulse during interval 4. The intervals 0, to 4 are also labeled below the wave form 52. By noting the position of the wave form 52 relative to the connection points along the line to the plurality of AND gates 46 it will be evident that, proceeding from right to left, there will be potential applied to the first AND gate, no potential applied to the second and third AND gates, potential applied to the 4th and no potential applied to the 5th when the "reading" pulse occurs. At this instant when the pulse PG2′ occurs, the digit signals that are supplied as outputs from the AND gates 46 to the inputs of the parallel decoder 47 are, reading from left to right, 01001 which corresponds to a correct translation of the cyclic input binary number to standard binary code. The decoder 47 accordingly supplies a positive potential output during the read interval PG2′ which, in amplitude, is proportional to the decimal value 9 and this potential is supplied directly thru rectifier 48 to terminal 51. The amplifier 49 reverses this potential from positive to negative and accordingly no potential is passed to the terminal 51 by way of rectifier 50.

Let us now consider the opposite condition illustrated by a second wave form 53, which is the reverse in polarity of the wave form 52 and which may, fortuitously, be supplied to the transmission line 44 depending upon the initial condition at which the translator 22 was set. Following the same explanation that was given for wave form 52, it will be clear that during the middle of the 4th digit interval when the reading pulse PG2′ occurs, the inputs to the parallel decoder 47 will be the digits signals, reading from left to right, 10110. For this case the reversed number is decoded for the intervals 0, 1, 2, and 3 and a negative voltage of weighted value −15 is supplied in the *n*th, that is the 4th interval. The output of the decoder 47 is now of correct magnitude but of incorrect sign. That is, the output of decoder 47 will be a negative potential of the correct magnitude. Since the potential is negative it is not passed by rectifier 48, but upon being reversed by the unity gain amplifier 49 it becomes a positive potential and is passed by rectifier 50 to the output terminal 51.

It will be clear that here, as in the previous cases the flip-flop translator 22 fortuitously translates the cyclic encoded input signal correctly, or as a reversed binary number, with a parity digit signal in the *n*th interval. Because a parallel encoder is here employed it has been unnecessary to supply the clock pulses which were needed in connection with the arrangements of Figs. 1 and 3 wherein serial decoders were employed. The arrangement, therefore, as in the previous cases provides a means, comprising the flip-flop or bistable unit 22, for translating pulse code group signals which are in cyclic binary code and transmitted with the least significant digit first, to corresponding pulse code group signals in standard binary code or pulse group signals in reversed standard binary code, together with a parity digit signal of the *n*th interval and the plurality of AND gates 46 provide means responsive to the parity digit signal for utilizing the translation as a standard binary signal. A parallel input digital decoder for this type of operation is disclosed in applicant's copending patent application Serial Number 219,104, entitled "Digital Decoder," filed April 3, 1951, now Patent No. 2,685,084.

In the three circuit arrangements of the invention, Figs. 1, 3, and 5, thus far described, arithmetic operations have not been encountered. The principal merits reside in the simple type of serially operating cyclic to standard binary translator which is provided and, as shown in Figs. 1 and 3, the employment of economically simple and inexpensive serially operating decoders which function only with standard binary forms of pulse code group signals transmitted with the least significant digit first.

It may be pointed out, however, that in many data transmission systems the encoded analogue data may require modification before decoding. For example, analogue data defining azimuth or elevation at the transmitting point may require parallel correction at the receiving point. Such operations require the arithmetic addition or subtraction of a standard binary number to the translated binary number. For such a condition, the translation and transmission with the least significant digit first permits the employment of relatively simple serially operating adders and subtractors which may not readily be used with other forms of transmission.

An arrangement which shows the advantages of the system where arithmetic operations are required is shown in Fig. 6, where there is disclosed, in block diagram form, a digital servo system which employs the operative features of the systems of Figs. 1, 3, and 5. In Fig. 6 the angular position of an input shaft 55 and that of an output shaft 55′ are to be periodically compared and a potential corresponding to their angular difference derived and used to energize the motor 71 which turns shaft 55′ so that it follows at all times the movement of input shaft 55. The arrangement therefore comprises input and output channels and the elements in the output channel which are similar to those of the input have been labeled by similar numbers primed. The entire operation is under control of clock pulse signals and program gating signals PG1 to PG6 which are supplied by the program generator 73. The angular position of input shaft 55 is periodically encoded, at a chosen uniform rate determined by generator 73, as pulse code group signals in the *n* digit cyclic binary code during intervals 1 to *n* by virtue of gating pulses PG6 which are supplied to the encoder 54 and which endure during these intervals. Clock pulses are also supplied to the encoder at the terminal labeled CP. Where the encoder 54 is remote from the rest of the apparatus shown, the process is one of synchronization with program generator 73 instead of direct control by the generator. The cyclic encoded output of 54 is transmitted serially, with the least significant digit signal first, to the bistable translator consisting of the NOT AND unit 57 and a one digit intereval delay line 58. The translator arrangement is identical with that described in Fig. 3 where the bistable translator was made up of units 34 and 35. The output of 57 is supplied to a two terminal AND gate 59 to which program pulses PG1 are supplied so that output pulses from 57 are passed by gate 59 during the digit intervals 0 to (*n*−1). In a similar manner, the position of the output shaft 55′ is encoded as cyclic binary pulse code group signals by encoder 54′ to which clock pulses are supplied and which is made active during intervals 1 to *n* by means of gate pulses PG6 which endure during these intervals.

The flip-flop translator comprised of units 57′ and 58′ is similar in form and operation to the corresponding translator composed of units 57 and 58, and the output of 57′ is supplied to one terminal of the AND gate 59′ which is actuated by the gate pulses PG1 during the intervals 0 to (*n*−1).

As in the systems previously described, the outputs of gates 59 and 59′ will be pulse code group signals corresponding to either the correct standard binary number or the reversed binary number during the intervals 0 to (*n*−1). The digit signals from translator units 57 and 57′ are also supplied respectively to input terminals of the AND gates 68 and 68′. Program pulses PG2 which endure for the *n*th intervals only are also supplied to a terminal of each of these gates. Accordingly there will be a control pulse output from gates 68 and 68′ during the *n*th intervals for the cases when the translation has occurred in reverse but there will be no pulse outputs from these gates for the cases when the translation is correct. The problem which the computer units of the arrangement solve is the production and selection of a correct error signal for operating the servomotor 71. Since it is entirely fortuitous that the translations from cyclic to standard binary code will be correct or reversed, the correct error signal is obtained by employing both a serial subtractor 60 and a serial added 61 to which the digit signal outputs of gates 59 and 59′ are supplied. These serial adders and subtractors will preferably be electronic arrangements of types now well known in the art such as those described in the aforementioned articles by Gray and Felker. Accordingly they are here indicated only by block diagram. Clock pulses, as is customary, are supplied to the adder and to the subtractor units.

In order to control the servomotor 71, which is mechanically coupled as indicated by the dash line 72, to the output shaft 55', it is desirable to obtain an error signal which is plus or minus depending upon the direction in which shaft 55' should be turned most quickly to reach a position of agreement with shaft 55. Accordingly it is necessary to obtain a voltage proportional to the difference of the binary numbers representing the positions of shafts 55 and 55'. If both of the numbers are standard binary numbers they may be subtracted to produce a standard binary number representing the difference. The difference can also be obtained by addition when one number, the minuend, is a correct standard binary number and the other, the subtrahend, is the complementary binary number. The true complement, as has been stated earlier, is obtained by adding a 1 to the reverse binary number, also called the 1's complement. This type of binary arithmetic is explained in much detail in the aforementioned article by Felker. Accordingly the serial adder 61 is arranged so that a clock pulse is added during the digit interval 0 by means of a program gating pulse PG3 which is applied to the gate 62 during the digit interval 0. This clock pulse which occurs during interval 0, is supplied to the "carry" input of the adder and it may be noted in passing that binary serial adders are ordinarily constructed to perform this operation of "adding a 1" during the first digit interval when subtraction is to be performed by the adder.

All but the most significant digit of the output of the subtractor 60 is decoded as a positive potential by a serial decoder 63 during intervals 0 to ($n$–2) by virtue of a program pulse PG4 which is applied during these intervals. A program pulse, PG5, which endures only during the interval ($n$–1) is also supplied to 63 to decode the most significant digit as a negative potential and thereby produce the correct polarity of output as will be explained more fully later. Similarly the output of the serial adder 61 is decoded by serial decoder 63' to which the program pulses PG4 and PG5 are supplied.

Decoder 63 and decoder 63' each produce an output potential one of which, fortuitously, represents the correct error signal and is to operate the servomotor 71 to minimize the difference. The output potentials of decoders 63 and 63' are supplied respectively to switch gates 64 and 64' and the outputs of 64 and 64' are both connected to a terminal of switch 66 and to the input terminal of a unity gain, polarity reversing amplifier 67. The output of 67 is connected to the other terminal of the electronic switch 66. The output of gates 68 and 68' are each connected to input terminals of a NOT AND gate 69 the output of which is coupled to an inhibiting gate 65 which normally passes a program pulse PG2 during the $n$th interval to gate 64. The output of the logical NOT AND unit 69 is also applied to an input of the gate 64'. An output of gate 68 is coupled to the control terminal of electronic switch 66 so that the switch is actuated when a pulse occurs at the output of gate 68 during the interval $n$. The error signal output from switch 66 is coupled by means of the connection labeled 70 to motor 71 to control its operation.

To better illustrate the operation, an example of a 4 digit binary system will be considered wherein the translated output from unit 57 is the correct or the reversed binary translation of the decimal number 14 and the output of the translator 57' is the correct or the reversed binary translation of the decimal number 11. The difference of these two numbers is +3 and the decoded output potential which is to actuate the motor 71 should be of magnitude and polarity corresponding to +3. Since the numbers are translated fortuitously correct or in reverse, the possible combinations of the translations of the numbers are listed below:

| | | | | |
|---|---|---|---|---|
| 14<br>11<br>–<br>3 | 0 1110<br>0 1011<br>–<br>0011=3 | 0 1110<br>1 0100<br>1+<br>0011=3 | 1 0001<br>1 0100<br>–<br>1101=–3 | 1 0001<br>0 1011<br>1+<br>1101=–3 |

Since the cyclic binary input numbers occur serially during digit intervals 1 to 4 and the output numbers occur during the digit intervals 0 to 3 together with a parity digit signal during interval 4 the translated numbers are written with the parity signal separated and at the left.

Of these four cases, the first one at the left illustrates the case where the number 14 is correctly translated as 1110 and the number 11 is also correctly translated as 1011. Accordingly the difference 3 represented by the binary number 0011 is as shown and is readily obtained from the serial subtractor 60 and decoded by serial decoder 63.

In the second column the number 14 is shown as correctly translated but the number 11 as translated in reverse together with a 1 in the parity digit interval. By the addition of a 1, a reversed translation of a number can be changed to the true complement and accordingly the translated numbers together with a 1 may be fed to the adder 61 and the sum is 0011=3 as shown above which again correctly represents the difference.

The third column from the left indicates the condition where both translations of the numbers 14 and 11 are in reverse and in each instance a 1 in the parity digit interval occurs. As the example shows, the subtractor will give the correct answer but negative in sign; that is, the output of the subtractor will be 1101=–3. The fourth possible combination is shown in the fourth column where the input number 14 is translated in reverse but the output number 11 is correctly translated. Here again by using the serial adder 61 and adding a 1, the output is correct in magnitude but not in sign. That is, the output of the adder for this condition will be 1101=–3.

It will now be shown that the pulses, which correspond to 1's in the parity digit intervals, may be used to cause the decoded output of the subtractor or the adder to be selected, depending upon which output provides the correct magnitude. Also it will be shown that the parity digit signal from translator unit 57 may be employed to correct the polarity of output. Consideration of the four possible combinations described shows that when the parity signals are both 0's or both 1's the subtractor is to be used. When, however, one of the parity digit signals is a 0 and the other is a 1, then the adder is to be used. In addition to this, when the translated input number contains a 1 in the parity interval the output sign is incorrect and must be reversed. It will be seen that these several control operations are taken care of by the circuit arrangements described. Thus, the parity digit signals appear at the outputs of the gates 68 and 68' during the $n$th interval and these are applied to the input terminals of the NOT AND gate circuit 69. When the parity digit signals are both 0's or both 1's there is no output pulse from unit 69 and with no output from 69 the inhibiting unit 65 is not actuated. Hence the program pulse PG2 during interval $n$ is applied to gate 64 so that gate 64 passes the output potential from decoder 63. Also, since there is no output pulse from unit 69, to actuate gate 64', no output from decoder 65' can pass thru gate 64'. Accordingly for this condition when the parity digit signals are both 0's or both 1's, the output of decoder 63, representing the subtractor 60 output, is utilized. Normally the switch 66 connects the line 70 to the outputs of units 64 and 64'. If, however, there is a 1 in the parity digit interval of the input number from 57, there is a pulse output from gate 68 which is supplied to the actuating terminal of the switch 66 causing the switch to be thrown to connect line 70 to the output of reversing amplifier 67 and, thereby, to reverse the algebraic sign of the output potential.

Consider, now, the case where there is a 1 in the parity digit interval in only one of the translator outputs. Under these conditions a pulse will be supplied during the parity interval to one of the input terminals of the NOT AND gate 69 but no pulse to the other terminal. Accordingly there will be an output pulse during the $n$th or parity interval from unit 69 which will actuate inhibiting circuit 65 and also actuate gate 64′. Thereby an output is obtained from serial decoder 63′ but not from decoder 63. Under these conditions the output of decoder 63′ which represents the output of adder 61 is utilized. If the input signal is the one which was translated in reverse by units 57, 58 a pulse output from gate 68 occurs during the parity interval which activates the switch 66 to again provide the correct polarity of output from the reversing amplifier 67.

A further example is now given to show the generality of the operation by considering that the input number was 11 and the output number was 14. The four possible combinations which illustrate this condition are:

| | | | | |
|---|---|---|---|---|
| 11<br>14<br>− | 0 1011<br>0 1110<br>− | 0 1011<br>1 0001<br>1+ | 1 0100<br>1 0001<br>− | 1 0100<br>0 1110<br>1+ |
| −3 | 1101=−3 | 1101=−3 | 0011=+3 | 0011=+3 |

It will be clear that here the difference should be −3. And it will be noted that in this, and in the preceding example, the four digit resultant is treated as a negative number if the most significant digit is a 1. In other words 1101 is read as −3 and not as +13. This amounts to using the weighted values of 1, 2, 4 and −8 in decoding.

If we follow thru for each of the examples, it will be seen that the parity digit signals are present to again control the operations so that the subtractor is used when the parity digit signals are both 0's or both 1's. Similarly the adder is used when one parity signal is an 0 and the other is a 1. Also, as in the previous examples, a 1 in the parity interval of the translated input number effects the operation of switch 66 to reverse the output potential and thereby correct the algebraic sign.

It will be observed that the outputs of serial decoders 63 and 63′ may be either plus or minus. From what has been said and illustrated relative to the Shannon type decoder which produces output potentials in accordance with the weighted values of the input digit signals, it will be clear that the decoder here contemplated may be similar to the arrangement shown in Fig. 3 where the complete decoder which provides two polarities of output potential is comprised of a serial decoder 38 which operates on all of the input digit signals except the last one and a source 40 to provide a chosen voltage of opposite sign for decoding the last digit signal. The arrangement would be modified slightly to read the decoder output during interval $n$.

If we consider the decoders 63 and 63′ to be similarly comprised so that, in our example of a four digit signal, they decode the first three digits of the number in proportion to their weighted values 1, 2, and 4 and decode the fourth digit as having the weighted values of −8, it will be evident that whenever the digit signal is a 1 during the digit interval 3 the output will change from a positive to a negative potential. The purpose of this type of decoding is to cause the motor 71 to run in whatever direction is the shorter to turn the shaft 55′ to agreement with the position of shaft 55. In other words for angles up to 180° the shaft 55 will turn in one direction but when the error angle exceeds 180° the shaft will turn in the opposite direction. The Fig. 3 form of a plus or minus output serial decoder was suggested as an arrangement for units 63 and 63′ to illustrate the operation. Other known forms may be employed which provide greater accuracy where the number of digits $n$ is large. For example an arrangement of two serial decoders may be employed. The two are arranged to operate simultaneously. One decodes the digits 1 to $(n-2)$ as a positive potential. The other decodes these same digits reversed (the ones complement) as a negative potential. If the digit signal in interval $(n-1)$ is a 1, the negative instead of the positive potential is selected as the output. A plus or minus type of decoder which operates in parallel but, however, illustrates the principle, has been very completely described and illustrated in applicant's pending application for a digital decoder above referred to.

It will be clear from the preceding description of Fig. 6 that the arrangement illustrates a digital servo system comprising the means 54 and 54′ which periodically encode and serially transmit in separate channels input and output analogue data of shaft positions 55 and 55′ as digital pulse code group signals in cyclic binary code. In each of the channels translating means are provided comprising the units 57 and 58 in the input channel and the units 57′ and 58′ in the output channel. These translators simultaneously and serially translate each of the transmitted pulse code group signals to corresponding pulse group signals in a form of the standard binary code together with control digit signals. The units 60 and 61 respectively are means for serially adding in the upper path and serially subtracting in the lower path the translated signals and units 63 and 63′ provided serial decoding means in each of the paths for producing in each a decoded potential. The plurality of gates, particularly gate 68 and 68′ and the NOT AND gate 69, comprise means for utilizing the control digit signals from both of the channels to select the one of the decoded potentials from decoder 63 and 63′ which, fortuitously, correctly represents the magnitude of the difference of the translated signals and the switch 66 controlled by the parity digit signal from gate 68 provides means for utilizing the control digital signal from the input channel to determine the polarity of the control potential supplied to the servo motor 71, which control potential is utilized to adjust the shaft 55′ so as to minimize the difference between input and output signals.

A preferred embodiment of the invention has been described, but many variations will be apparent to those skilled in the art. What is claimed is:

1. A digital system comprising means for periodically generating signalling values as pulse code group signals in the $n$ digit cyclic binary code, means for transmitting said pulse groups serially during consecutive digit intervals 1 to $n$, with the least significant digit first, means for serially translating said pulse code groups to corresponding pulse code group signals in a form of the $n$ digit standard binary code during the digit interval 0 to $(n-1)$, where the interval 0 occurs one interval earlier in time than the interval 1, together with a control digit signal in the interval $n$ and means responsive to said control digit signal for utilizing said form of translated signals.

2. A signalling system comprising means for periodically generating signalling values as pulse code group signals in the $n$ digit cyclic binary code, means for transmitting said pulse groups serially during consecutive digit intervals 1 to $n$, with the least significant digit first, means for serially translating said pulse code groups to corresponding pulse code group signals in a form of the $n$ digit standard binary code during the digit intervals 0 to $(n-1)$, where the interval 0 occurs one interval earlier in time than the interval 1, together with a control digit signal in the interval $n$ and means responsive to said control digit signal for utilizing said form of translated signals as standard binary code group signals.

3. A signalling system comprising means for periodically generating signalling values as pulse code group signals in the $n$ digit cyclic binary code, means for transmitting said pulse groups serially during consecutive digit intervals 1 to $n$, with the least significant digit first, means for serially translating said pulse code groups to corresponding pulse code group signals in the $n$ digit standard or reversed standard binary code during the digit intervals 0 to $(n-1)$, where the interval 0 occurs one interval earlier in time than the interval 1, together with a control digit signal in the interval $n$ and means responsive to said control digit signal for utilizing either said standard or said reversed standard translated signals as standard binary code group signals.

4. A signalling system comprising means for periodically generating signalling values as pulse code group signals in the $n$ digit cyclic binary code, means for transmitting said pulse groups serially during consecutive digit intervals 1 to $n$, with the least significant digit first, translating means comprising a circuit having two stable and reversible conditions of operation, means for applying said pulse signals to said translating means successively to reverse the conditions of operation from one stable condition to the other, to convert said pulse code groups to corresponding pulse code group signals in a form of the $n$ digit standard binary code during the digit intervals 0 to $(n-1)$, where the interval 0 occurs one interval earlier in time than the interval 1, together with a control digit signal in the interval $n$ and means responsive to said control digit signal for utilizing said form of translated signals as standard binary code group signals.

5. A signalling system comprising means for periodically generating signalling values as pulse code group signals in the $n$ digit cyclic binary code, means for transmitting said pulse groups serially during consecutive digit intervals 1 to $n$, with the least significant digit first, translating means comprising a circuit having two stable and reversible conditions of operation, means for applying said pulse signals to said translating means successively to reverse the condition of operation from one stable condition to the other, to convert said pulse code groups to corresponding pulse code group signals in the $n$ digit standard or reversed standard binary code during the digit intervals 0 to $(n-1)$, where the interval 0 occurs one interval earlier in time than the interval 1, together with a control digit signal in the interval $n$ and means responsive to said control digit signal for utilizing either said standard or said reversed standard translated signals as standard binary code group signals.

6. A signalling system comprising means for periodically generating signalling values as pulse code group signals in the $n$ digit cyclic binary code, means for transmitting said pulse groups serially during consecutive digit intervals 1 to $n$, with the least significant digit first, translating means comprising a circuit having two stable and reversible conditions of operation, means for applying said pulse signals to said translating means successively to reverse the condition of operation from one stable condition to the other, simultaneously to convert said pulse code groups to corresponding pulse code group signals in both the $n$ digit standard and reversed standard binary code during the digit intervals 0 to $(n-1)$, where the interval 0 occurs one interval earlier in time than the interval 1, together with control digit signals in the interval $n$ and means responsive to said control digit signals for selecting and utilizing said translated signals which are standard binary code group signals.

7. A signalling system comprising means for periodically generating signalling values as pulse code group signals in the $n$ digit cyclic binary code, means for transmitting said pulse groups serially during consecutive digit intervals 1 to $n$, with the least significant digit first, translating means comprising a circuit having two stable and reversible conditions of operation, means for applying said pulse signals to said translating means successively to reverse the condition of operation from one stable condition to the other to provide a gating potential, a source of clocked pulse signals, means for utilizing said gating potential and said clocked pulse signals to convert said pulse code groups to corresponding pulse code group signals in the $n$ digit standard or reversed standard binary code during the digit intervals 0 to $(n-1)$, where the interval 0 occurs one interval earlier in time than the interval 1, together with a control digit signal in the interval $n$ and means responsive to said control digit signal for utilizing either said standard or said reversed translated signal as standard binary code group signals.

8. A synchronous signalling system comprising means for generating clock pulse signals and gating signals, means utilizing said gating signals for periodically generating signalling values as pulse code group signals in the $n$ digit cyclic binary code, means for transmitting said pulse groups serially during consecutive digit intervals 1 to $n$, with the least significant digit first, translating means comprising a circuit having two stable and reversible conditions of operation, means for applying said pulse code group signals to said translating means successively to reverse the condition of operation from one stable condition to the other to provide a gating potential, means utilizing said gating potential, said gating signals and said clock pulse signals to convert said pulse code groups to corresponding pulse code group signals in the $n$ digit standard or reversed standard binary code during the digit intervals 0 to $(n-1)$, where the interval 0 occurs one interval earlier in time than the interval 1, together with a control digit signal in the interval $n$ and means responsive to said control digit signal and gating signals for utilizing either form of said translated signals as standard binary code group signals.

9. A signalling system comprising means for periodically generating signalling values as pulse code group signals in the $n$ digit cyclic binary code, means for transmitting said pulse groups serially during consecutive digit intervals 1 to $n$, with the least significant digit first, translating means operatively controlled by said pulse signals for producing two potential waves of complementary forms which represent the $n$ digit standard and the reversed standard binary code during the digit intervals 0 to $(n-1)$, where the interval 0 occurs one interval earlier in time than the interval 1, together with a control digit signal in the interval $n$, means for generating a gating signal during the interval $n$ and means responsive to said gating signal for selecting and utilizing the one of said potential waves which represents a standard binary code group signal.

10. A signalling system comprising means for periodically generating signalling values as pulse code group signals in the $n$ digit cyclic binary code, means for transmitting said pulse groups serially during consecutive digit intervals 1 to $n$, with the least significant digit first, translating means operatively controlled by said pulse signals for producing a potential wave of a form which represents the $n$ digit standard or reversed standard binary code during the digit intervals 0 to $(n-1)$, where the interval 0 occurs one interval earlier in time than the interval 1, together with a control digit signal in the interval $n$, means for generating a gating signal during said interval $n$ and means responsive to said gating signal for utilizing said potential wave as standard binary code group signals.

11. A signalling system comprising means for periodically generating signalling values as pulse code group signals in the $n$ digit cyclic binary code, means for transmitting said pulse groups serially during consecutive digit intervals 1 to $n$, with the least significant digit first, translating means comprising a circuit having two stable and reversible conditions of operation, means for applying said pulse signals to said translating means successively to reverse the condition of operation from one stable condition to the other to produce a potential wave of a form which represents the $n$ digit standard or reversed standard binary code during the digit intervals 0 to $(n-1)$, where the interval 0 occurs one interval earlier in time than the interval 1, together with a control digit signal in the interval $n$, means for generating a gating signal during said interval $n$ and means responsive to said gating signal for utilizing said potential wave as a standard binary code group signal.

12. A digital servo system comprising means for periodically encoding and serially transmitting in separate channels input and output analogue data as digital pulse code group signals each in cyclic binary code, means in each channel comprising a bistable circuit for simultaneously and serially translating each of said pulse code group signals to corresponding pulse code group signals in a form of the standard binary code, together with a digit control signal, means for serially adding in one path and subtracting in another path said translated signals, serial decoding means in each path for producing a decoded potential, means utilizing said control digit signals from both of said channels to select the one of said decoded potential which correctly represents the magnitude of the difference of said translated signals together with means for utilizing the control digit signal from said input channel to determine the polarity of said potential thereby to provide an error control potential and means for utilizing said control potential to adjust the source of said output analogue data so as to minimize said difference.

13. A digital servo system comprising means for periodically encoding and serially transmitting in separate channels input and output analogue data as digital pulse code group signals each in the $n$ digit cyclic binary code during successive digit intervals 1 to $n$, means in each channel comprising a bistable circuit for simultaneously and serially translating each of said pulse code group signals to corresponding pulse code group signals in a form of the $n$ digit standard binary code during successive digit intervals 0 to $(n-1)$, where the interval 0 occurs one interval earlier in time than the interval 1, together with a digit control signal in the interval $n$, means for serially adding and decoding said translated signals in one path and subtracting and decoding said translated signals in another path to produce in each path a decoded potential, means utilizing said control digit signals from both of said channels to select the one of said decoded potentials whichever correctly represents the magnitude of the difference of said translated signals together with means for utilizing the control digit signal from said input channel to determine the polarity of said potential thereby to provide an error control potential and means for utilizing said control potential to adjust the source of said output analogue data so as to minimize said difference.

14. A digital servo system comprising means for periodically encoding and serially transmitting in separate channels, with the least significant digit first, input and output analogue data as pulse code group signals each in the $n$ digit cyclic binary code during successive digit intervals 1 to $n$, means in each channel comprising a circuit having two stable conditions operatively reversible by successive pulses of each group, for simultaneously and serially translating each of said pulse code group signals to corresponding pulse code group signals in a form of the $n$ digit standard binary code during successive digit intervals 0 to $(n-1)$, where the interval 0 occurs one interval earlier in time than the interval 1, together with a digit control signal in the interval $n$; means for serially adding in one path and subtracting in another path said translated signals to produce in each path a digital signal resultant, means in each path for serially decoding the resultant to produce in each path a potential corresponding to the magnitude of said resultant, means utilizing said control digit signals from both of said channels to select the one of said decoded potentials which correctly represents the magnitude of the difference of said translated signals together with means for utilizing the control digit signal from said input channel to determine the polarity of said potential thereby to provide an error control potential and means for utilizing said control potential to adjust the source of said output analogue data so as to minimize said difference.

15. A digital servo system comprising means for periodically encoding and serially transmitting in separate channels, input and output analogue data as pulse code group signals each in the $n$ digit cyclic binary code during successive digit intervals 1 to $n$, means in each channel comprising a bistable circuit for simultaneously and serially translating each of said pulse code group signals to corresponding pulse code group signals which are in the $n$ digit standard or reversed standard binary code during successive digit intervals 0 to $(n-1)$, where the interval 0 occurs one interval earlier in time than the interval 1, together with a digit control signal in the interval $n$, means for serially adding in one path said translated signals plus a digit signal of unity value and subtracting in another path said translated signals to provide in each path a digital signal resultant, means in each path for serially decoding said resultants to produce in each path a potential corresponding to the magnitude of said resultant, means utilizing said control digit signals from both of said channels to select the one of said decoded potentials whichever correctly represents the magnitude of the difference of said translated signals together with means for utilizing the control digit signal from said input channel to determine the polarity of said potential thereby to provide an error control potential and means for utilizing said control potential to adjust the source of said output analogue data so as to minimize said difference.

16. A synchronized digital servo system comprising a programing wave form generator, means operatively controlled by said generator for periodically encoding and serially transmitting in separate channels, input and output analogue data as pulse code group signals each in the $n$ digit cyclic binary code during successive digit intervals 1 to $n$, means in each channel operatively controlled by said generator comprising a bistable circuit for simultaneously and serially translating each of said pulse code group signals to corresponding pulse code group signals in a form of the $n$ digit standard binary code during successive digit intervals 0 to $(n-1)$, where the interval 0 occurs one interval earlier in time than the interval 1, together with a digit control signal in the interval $n$, means operatively controlled by said generator for serially adding in one path and subtracting in another path said translated signals to produce in each path a digital signal resultant, means in each path for serially decoding said resultants to produce in each path a potential corresponding to the magnitude of said resultant, means operatively controlled by said generator and utilizing said control digit signals from both of said channels to select the one of said decoded potentials whichever correctly represents the magnitude of the difference of said translated signals together with means for utilizing the control digit signal from said input channel to determine the polarity of said potential thereby to provide an error control potential and means for utilizing said control potential to adjust the source of said output analogue data so as to minimize said difference.

References Cited in the file of this patent

UNITED STATES PATENTS

| | | |
|---|---|---|
| 2,518,022 | Keister | Aug. 8, 1950 |
| 2,537,427 | Seid et al. | Jan. 9, 1951 |
| 2,538,615 | Carbrey | Jan. 16, 1951 |
| 2,576,099 | Bray et al. | Nov. 27, 1951 |
| 2,590,110 | Lippel | Mar. 25, 1952 |
| 2,609,143 | Stibitz | Sept. 2, 1952 |
| 2,630,552 | Johnson | Mar. 3, 1953 |
| 2,660,618 | Aigrain | Nov. 24, 1953 |
| 2,685,054 | Brenner et al. | July 27, 1954 |